(12) United States Patent
Kume

(10) Patent No.: US 8,863,607 B2
(45) Date of Patent: Oct. 21, 2014

(54) UMBILICAL MEMBER TREATMENT DEVICE

(71) Applicant: FANUC Corporation, Yamanashi (JP)

(72) Inventor: Hirokazu Kume, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/761,379

(22) Filed: Feb. 7, 2013

(65) Prior Publication Data

US 2013/0255817 A1    Oct. 3, 2013

(30) Foreign Application Priority Data

Mar. 27, 2012    (JP) ................... 2012-070839

(51) Int. Cl.
*F16L 3/08*    (2006.01)
*F16L 3/01*    (2006.01)

(52) U.S. Cl.
CPC .... *F16L 3/08* (2013.01); *F16L 3/01* (2013.01)
USPC ....................... 74/490.02; 138/106

(58) Field of Classification Search
CPC ....................... F16L 3/08; F16L 3/01
USPC ........ 74/490.02, 490.01; 901/27–29; 138/106
See application file for complete search history.

(56) References Cited

U.S. PATENT DOCUMENTS

| | | | | |
|---|---|---|---|---|
| 3,127,194 A | * | 3/1964 | Jeffries | ........................ 280/421 |
| 5,339,866 A | * | 8/1994 | Holt | ............................... 138/111 |
| 6,014,909 A | | 1/2000 | Fiora | |
| 7,806,019 B2 | * | 10/2010 | Iwai et al. | ................... 74/490.02 |
| 2002/0066331 A1 | | 6/2002 | Okada et al. | |
| 2003/0200831 A1 | | 10/2003 | Matsumoto et al. | |
| 2004/0179900 A1 | | 9/2004 | Uematsu et al. | |
| 2005/0189333 A1 | | 9/2005 | Nakagiri et al. | |
| 2007/0031232 A1 | | 2/2007 | Kurebayashi et al. | |
| 2007/0138991 A1 | | 6/2007 | Kumagai et al. | |

FOREIGN PATENT DOCUMENTS

| | | |
|---|---|---|
| DE | 196 49 491 | 8/1997 |
| DE | 69 800 450 | 9/2001 |
| DE | 103 94 179 | 2/2006 |
| DE | 60 2004 005 369 | 7/2007 |
| DE | 10 2007 009 850 | 9/2008 |
| EP | 1 964 651 | 9/2008 |

(Continued)

*Primary Examiner* — David M Fenstermacher
*Assistant Examiner* — Terence Boes
(74) *Attorney, Agent, or Firm* — Drinker Biddle & Reath LLP

(57) ABSTRACT

An umbilical member treatment device (10) includes a pipe member (25) which is attached to a second engaging member (12) coaxially with the rotational axis and umbilical member fastening parts at both a first engaging member (11) and the second engaging member, the umbilical member fastening parts fastening the plurality of umbilical members so that at one end or both ends of the pipe member, the plurality of umbilical members form approximately U-shapes, at the umbilical member fastening parts, at least two umbilical members among the plurality of umbilical members being arranged adjoining each other in a ribbon shape, all of the at least two umbilical members being made to abut on an inner circumferential surface near one end or both ends of the pipe member within a range of relative rotational angle between the first engaging member and second engaging member.

15 Claims, 14 Drawing Sheets

(56) References Cited

FOREIGN PATENT DOCUMENTS

| | | | |
|---|---|---|---|
| JP | 8-197482 | A | 8/1996 |
| JP | 2553843 | Y2 | 11/1997 |
| JP | 2001353684 | A | 12/2001 |
| JP | 3746244 | B2 | 2/2006 |
| JP | 3830488 | B2 | 10/2006 |
| JP | 2011-016183 | | 1/2011 |
| JP | 2011-031311 | | 2/2011 |

* cited by examiner

UMBILICAL MEMBER TREATMENT DEVICE

RELATED APPLICATION DATA

This application claims priority under 35 U.S.C. §119 and/or §365 to Japanese Application No. 2012-070839 filed Mar. 27, 2012, the entire contents of which is incorporated herein by reference.

BACKGROUND OF INVENTION

1. Field of Invention

The present invention relates to an umbilical member treatment device of an industrial robot. In particular, the present invention relates to an umbilical member treatment device which is used at the wrist part of an industrial robot etc.

2. Description of Related Art

The front end of the wrist part of an industrial robot is provided with a welding gun or hand. To drive these welding gun or hand, it is necessary to lay a lot of umbilical members, such as cables which supply power or signals, or tubes which feed cooling water or drive air, up to the wrist part etc. of the robot.

The wrist part of an industrial robot includes a first engaging member and a second engaging member which are engaged with each other and which rotate relative to each other about a predetermined rotational axis. Japanese Patent Publication No. 2001-353684 A1 Japanese Patent Publication No. 08-197482 A1, and Japanese Utility Model Registration No. 2553843 disclose configurations in which one of the first engaging member and second engaging member is additionally provided with a pipe member which extends along the rotational axis. Further, the first engaging member and the second engaging member are provided with umbilical member fastening parts which fasten the plurality of umbilical members. The plurality of umbilical members pass through the hollow part of the pipe member in the longitudinal direction and are fastened by respective umbilical member fastening parts to the first engaging member and the second engaging member.

Furthermore, Japanese Patent No. 3830488 discloses a configuration which is provided with a mutually concentrically arranged inside pipe member and outside pipe member. In this case, the plurality of umbilical members are divided into two groups. One group is passed through the inside of the inside pipe member, while the other group is passed between the inside pipe member and the outside pipe member. Therefore, the groups of umbilical members can be kept from being twisted or rubbing against each other and the lifetime of the umbilical members can be extended.

However, the above-mentioned prior art has the following defects.

First, if merely extending a plurality of umbilical members along the rotational axis in the longitudinal direction, absorption of twisting requires that a sufficient distance in the direction of the rotational axis be secured. Further, to keep umbilical members from contacting the pipe member, the diameter of the pipe member also should be made sufficiently large for the plurality of umbilical members. However, in particular, at the front end of the wrist part of an industrial robot, securing sufficient space is difficult.

Furthermore, when employing an inside pipe member and an outside pipe member, the structure becomes complicated and a larger space compared with when requiring a single pipe member. As explained above, securing such a large space is difficult at the front end of the wrist part of an industrial robot.

The present invention was made in consideration of such a situation and has as its object the provision of an umbilical member treatment device which is used at the wrist part of a robot etc. and which is simpler and smaller in size than the prior art.

SUMMARY OF INVENTION

To achieve the above-mentioned object, according to a first aspect, there is provided an umbilical member treatment device which passes a plurality of umbilical members between a first engaging member and a second engaging member which are engaged with each other and which rotate relative to each other about a predetermined rotational axis of a robot, comprising a pipe member which is attached to the second engaging member coaxially with the rotational axis and through the inside of which the plurality of umbilical members pass, and umbilical member fastening parts at both the first engaging member and the second engaging member, the umbilical member fastening parts fastening the plurality of umbilical members so that at one end or both ends of the pipe member, the plurality of umbilical members form approximately U-shapes or approximately J-shapes, at the umbilical member fastening parts, at least two umbilical members among the plurality of umbilical members being arranged adjoining each other in a ribbon shape, all of the at least two umbilical members being made to abut on an inner circumferential surface near one end or both ends of the pipe member within a range of relative rotational angle between the first engaging member and second engaging member.

According to the second aspect, there is provided the first aspect wherein the at least two umbilical members are given elasticities which are higher than the elasticities of the remaining umbilical members among the plurality of umbilical members.

According to a third aspect, there is provided the first or second aspect wherein at least part of the inner circumferential surface of the pipe member is surface treated so that friction of at least part of the inner circumferential surface of the pipe member which the umbilical members contact is made to become smaller than the friction at the remaining part of the inner circumferential surface of the pipe member.

According to a fourth aspect, there is provided any of the first to third aspects which further includes a collar which is provided at least at one of an end and inner circumferential surface of the pipe member which the umbilical members contact.

According to a fifth aspect, there is provided any of the first to fourth aspects which further includes a cover which covers up to the umbilical member fastening part corresponding to an end of the pipe member from that end.

According to a sixth aspect, there is provided any of the first to fifth aspects wherein the first engaging member and the second engaging member form parts of a body of the robot.

According to a seventh aspect, there is provided any of first to fifth aspects wherein the first engaging member and the second engaging member are members which form a wrist part of a body of the robot.

These objects, features, and advantages of the present invention and other objects, features, and advantages will become further clearer from the detailed description of typical embodiments of the present invention which are shown in the attached drawing.

DETAILED DESCRIPTION

Below, the attached figures will be referred to so as to explain the embodiments of the present invention. In the following figures, similar members are assigned similar reference signs. To facilitate understanding, these figures are suitably changed in scale.

Figure 1:
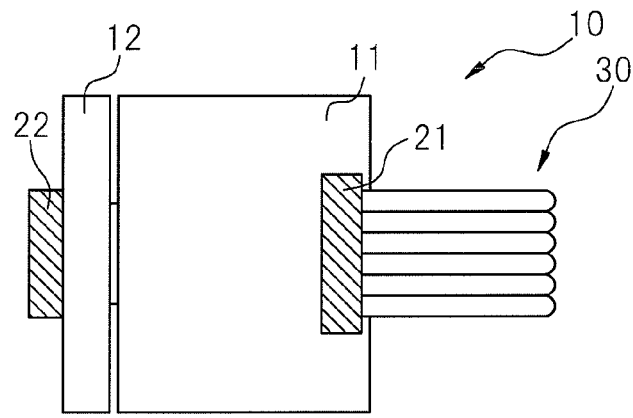
FIG. 1 is a top view of an umbilical member treatment device according to a first embodiment of the present invention.
Figure 14:
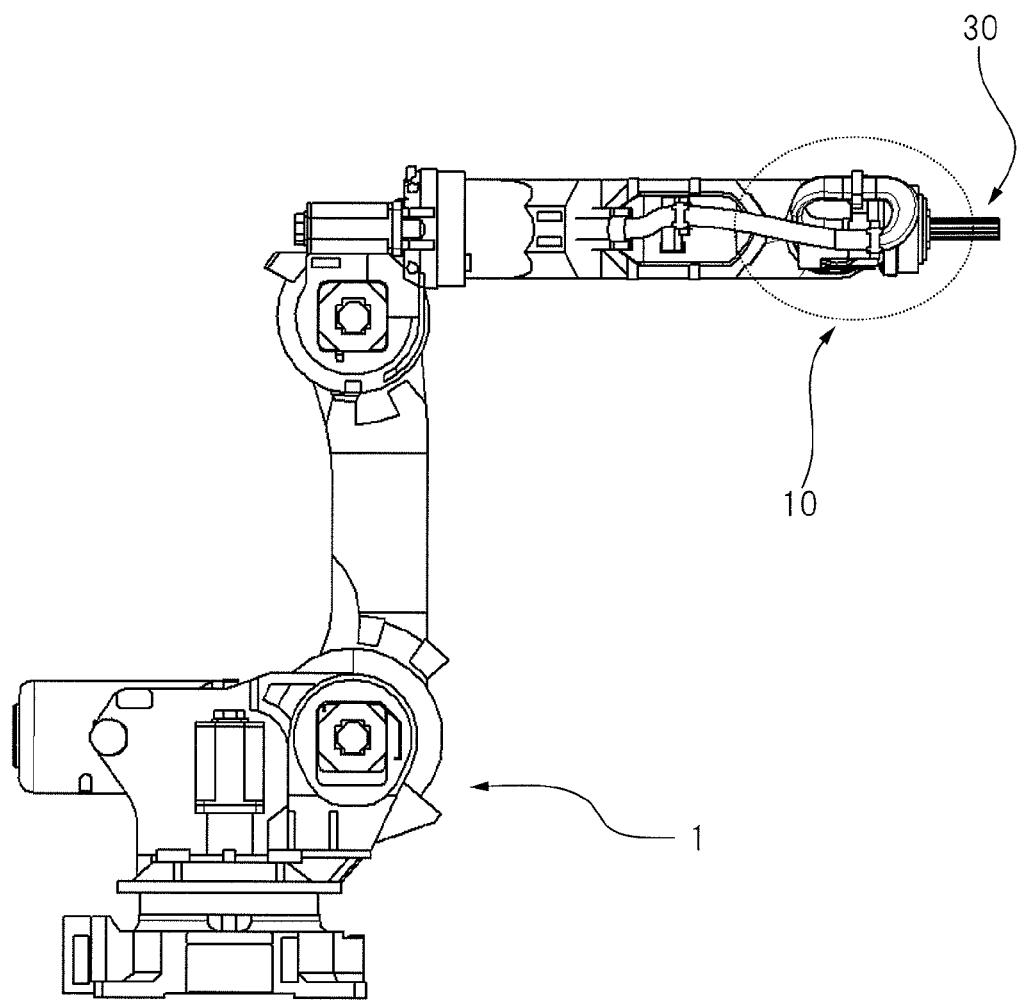
FIG. 14 is a side view of a robot which is provided with an umbilical member treatment device according to the present invention.

FIG. 14 is a side view of a robot which is provided with an umbilical member treatment device according to the present invention. The umbilical member treatment device 10 is assumed to be one which is provided at a wrist part of an industrial robot 1, for example, a multiarticulated robot. Further, FIG. 1 is a top view of an umbilical member treatment device according to a first embodiment of the present invention. As shown in FIG. 1, the umbilical member treatment device 10 includes a first engaging member 11 and a second engaging member 12 which adjoins and is engaged with the first engaging member 11.

Note that, these first engaging member 11 and second engaging member 12 may also be parts of the body of the industrial robot 1. Alternatively, these first engaging member 11 and second engaging member 12 may also form the wrist part of the industrial robot 1. In such a case, the industrial robot 1 is kept from becoming larger in size.

Figure 2:
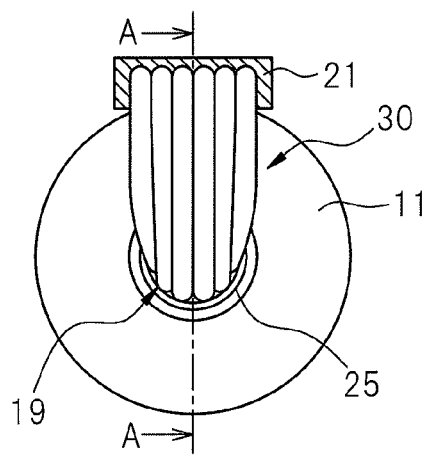
FIG. 2 is an end view of the umbilical member treatment device which is shown in FIG. 1.
Figure 3:
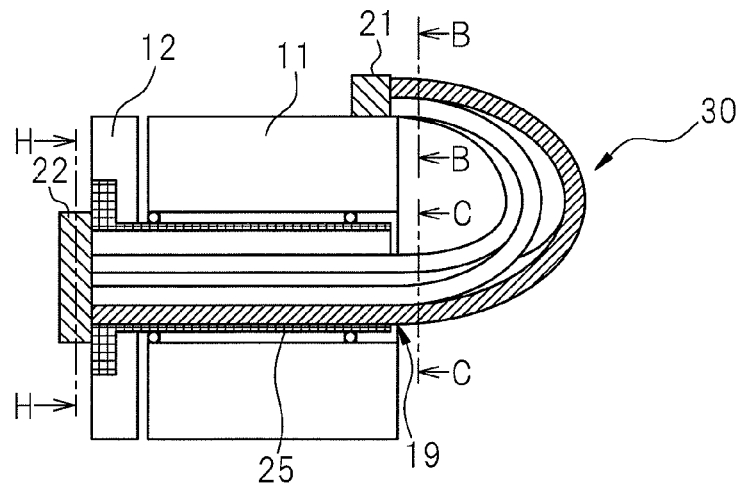
FIG. 3 is a cross-sectional view of the umbilical member treatment device seen along the line A-A of FIG. 2.

FIG. 2 is an end view of the umbilical member treatment device which is shown in FIG. 1, while FIG. 3 is a cross-sectional view of the umbilical member treatment device seen along the line A-A of FIG. 2. As can be seen from FIG. 1 to FIG. 3, the first engaging member 11 is a substantially cylindrically shaped member, at the top part of which a first umbilical member fastening part 21 is attached. The second engaging member 12 is a substantially cylindrically shaped member which is shorter than the first engaging member 11 and is arranged coaxially with the first engaging member 11. Further, the end face of the second engaging member 12 has a second umbilical member fastening part 22 attached to it.

As shown in FIG. 3, a pipe member 25 is inserted from an outside end face of the second engaging member 12 and is fastened integrally with the second engaging member 12. This pipe member 25 is inserted into a through hole which is formed at the center of the first engaging member 11. Therefore, a center line of the pipe member 25 substantially matches a center line of the first engaging member 11. Due to such a configuration, the first engaging member 11 and the second engaging member 12 can rotate relative to each other.

As can be seen from FIG. 1 to FIG. 3, a plurality of umbilical members 30 are passed through the through holes of the first engaging member 11 and second engaging member 12. These umbilical members 30 are fastened by the first umbilical member fastening part 21 and the second umbilical member fastening part 22 respectively to the first engaging member 11 and the second engaging member 12.

The plurality of umbilical members 30 are cables which supply power or signals and tubes which supply cooling water or drive air for driving a welding gun or hand which is attached to the front end of the robot. Note that, in actuality, the plurality of umbilical members 30 pass through the first umbilical member fastening part 21 and the second umbilical member fastening part 22 and extend further, but for purposes of simplification, the plurality of umbilical members 30 are shown only between the first umbilical member fastening part 21 and the second umbilical member fastening part 22. Note that, the same is true for other figures as well.

As shown in FIG. 3, the plurality of umbilical members 30 are led out from the through hole of the end face of the first engaging member 11 at the opposite side from the second engaging member 12. Further, the plurality of umbilical members 30 are curved upward forming approximately U-shapes and are fastened by the first umbilical member fastening part 21.

Figure 4A:
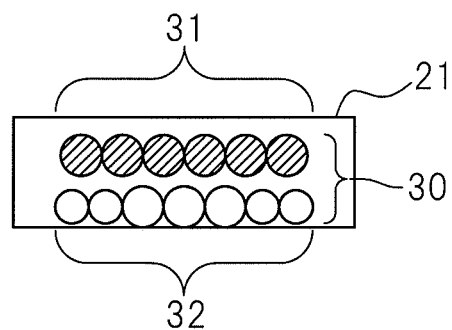
FIG. 4A is a cross-sectional view of the umbilical member treatment device seen along the line B-B of FIG. 3.

FIG. 4A is a cross-sectional view of the umbilical member treatment device seen along the line B-B of FIG. 3. As shown in FIG. 4A, at the first umbilical member fastening part 21, among the plurality of umbilical members 30, one group of umbilical members 31 (at least two umbilical members 31) are arranged adjoining each other in a ribbon shape. This will be explained later with reference to FIG. 16. The one group of umbilical members 31 may also be joined together along their longitudinal parts to form a ribbon shape overall by a binder etc. As shown in FIG. 4A, the one group of umbilical members 31 are relatively flat. The umbilical members which form the one group of umbilical members 31 are preferably formed from a material which is harder and higher in elasticity than the remaining group of umbilical members 32, for example, urethane etc.

In FIG. 4A, the one group of umbilical members 31 are fastened to the first umbilical member fastening part 21. In the plurality of umbilical members 30, the remaining group of umbilical members 32 are arranged at a part of the first umbilical member fastening part 21 where the one group of umbilical members 31 are not present. These remaining group of umbilical members 32 are mutually independent and extend up to the first umbilical member fastening part 21.

Figure 4B:
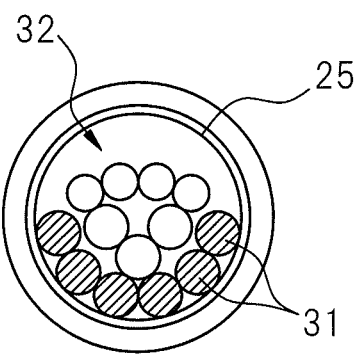
FIG. 4B is a cross-sectional view of the umbilical member treatment device seen along the line C-C of FIG. 3.
Figure 4C:
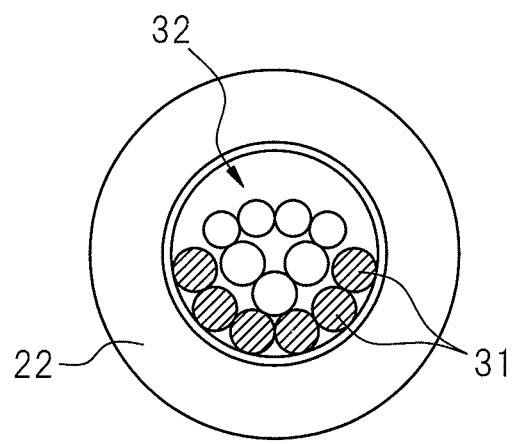
FIG. 4C is a cross-sectional view seen along the line H-H of FIG. 3.

FIG. 4B is a cross-sectional view of the umbilical member treatment device seen along the line C-C of FIG. 3. As shown in FIG. 4B, near an end face of the first engaging member 11, the one group of umbilical members 31 which are arranged in a ribbon shape are positioned at the bottom half of the pipe member 25. As can be seen from FIG. 2, FIG. 3, and FIG. 4B, the one group of umbilical members 31 abut on an abutting location 19 of the inner circumferential surface near one end of the pipe member 25. Further, the remaining group of umbilical members 32 are positioned at another part of the pipe member 25 where the one group of umbilical members 31 are not present. Further, in FIG. 4B, the top part of the pipe member 25 has a region in which the plurality of umbilical members 30 are not arranged. Furthermore, FIG. 4C is a cross-sectional view seen along the line H-H of FIG. 3. In the same way as FIG. 4B, in the second umbilical member fastening part 22 as well, the one group of umbilical members 31 abut on the inner circumferential surface of the second umbilical member fastening part 22, while the remaining group of umbilical members 32 are positioned at another part of the second umbilical member fastening part 22 where the one group of umbilical members 31 are not present.

Figure 5A:
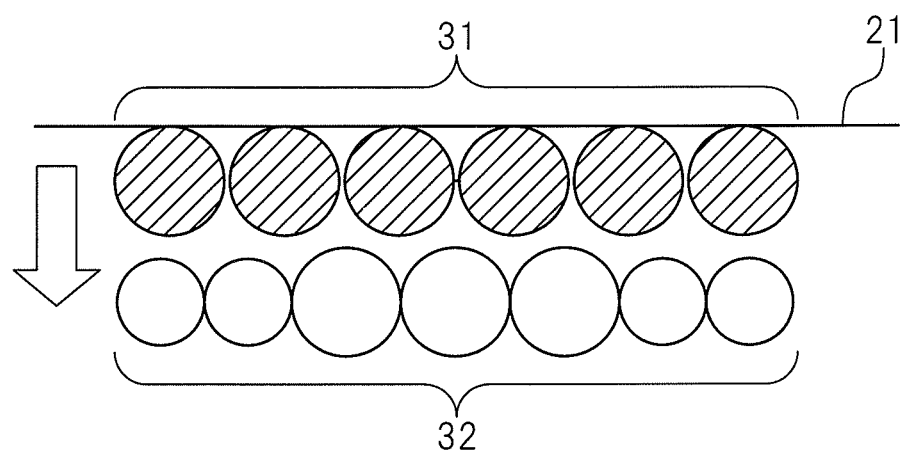
FIG. 5A is a first view which shows a plurality of umbilical members at an umbilical member fastening part.
Figure 5B:
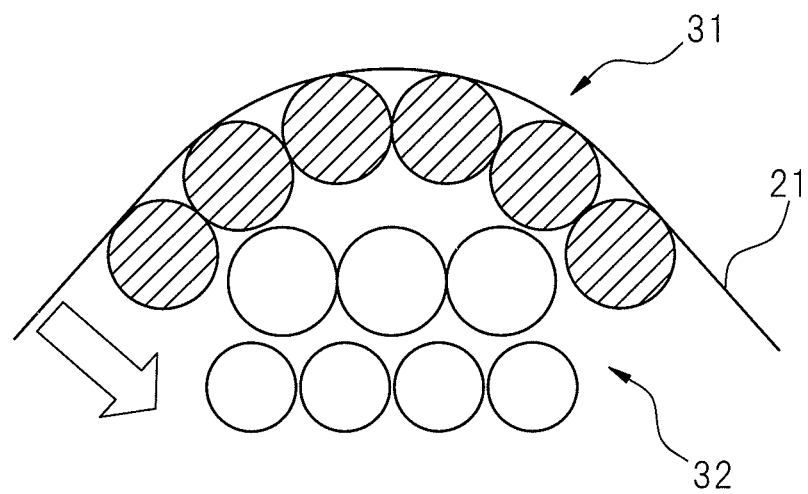
FIG. 5B is a second view which shows a plurality of umbilical members at an umbilical member fastening part.

FIG. 5A and FIG. 5B are views which show a plurality of umbilical members at an umbilical member fastening part. As shown in FIG. 5A, when the top inner surface of the first umbilical member fastening part 21 is flat, the one group of umbilical members 31 among the plurality of umbilical member 30 are fastened to the first umbilical member fastening part 21 in the form a ribbon shape.

As shown in FIG. 5B, when the top inner surface of the first umbilical member fastening part 21 is curved, the one group of umbilical members 31 are curved corresponding to the top inner surface when fastened to the first umbilical member fastening part 21. Further, in FIG. 5A and FIG. 5B, the one group of umbilical members 31 are arranged in only one row, but the one group of umbilical members 31 which form the ribbon shape may also form a plurality of rows. Note that, in both FIG. 5A and FIG. 5B, the remaining group of umbilical members 32 among the plurality of umbilical member 30 are positioned at the inside from the one group of umbilical members 31 in the first umbilical member fastening part 21.

Figure 6:
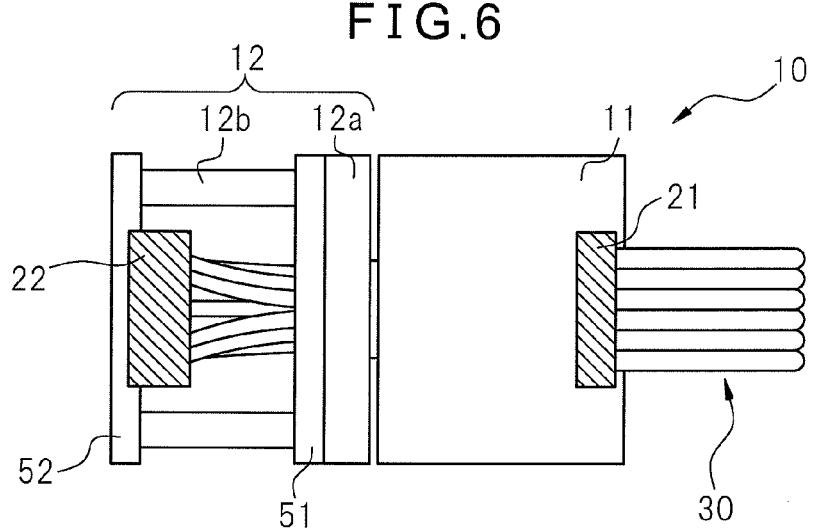
FIG. 6 is a top view of an umbilical member treatment device according to a second embodiment of the present invention.
Figure 7:
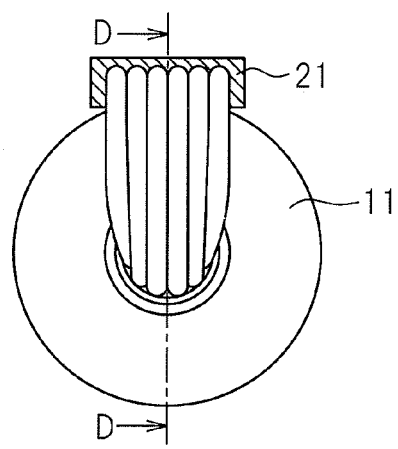
FIG. 7 is an end view of the umbilical member treatment device which is shown in FIG. 6.
Figure 8:
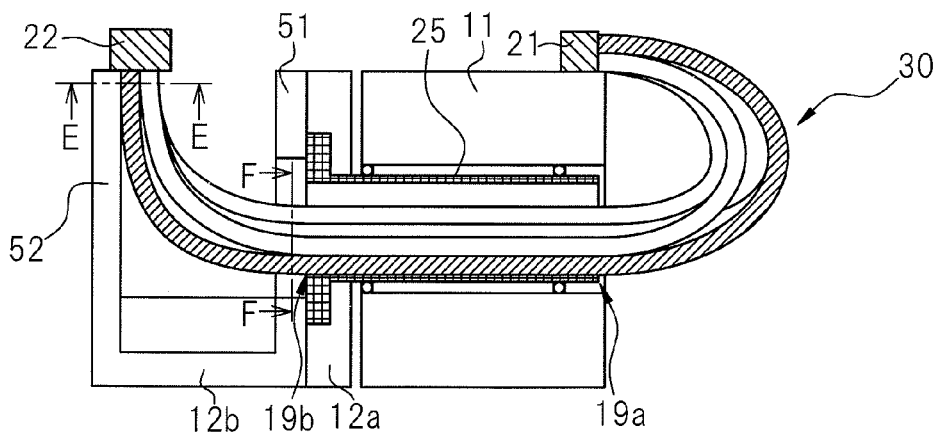
FIG. 8 is a cross-sectional view of the umbilical member treatment device seen along the line D-D of FIG. 7.

FIG. 6 is a top view of an umbilical member treatment device according to a second embodiment of the present invention, FIG. 7 is an end view of the umbilical member treatment device which is shown in FIG. 6, and FIG. 8 is a cross-sectional view of the umbilical member treatment device seen along the line D-D of FIG. 7. As shown in these figures, the second engaging member 12 of the umbilical member treatment device 10 in the second embodiment includes a cylindrical member 12a which adjoins the first engaging member 11 and a frame member 12b which is fastened to the cylindrical member 12a. The cylindrical member 12a is configured similar to the second engaging member 12 in the first embodiment.

As can be seen by comparison of FIG. 6 and FIG. 8, the frame member 12b is substantially tubular if seen from above, but at the cross-section of the umbilical member treatment device 10 passing through the center line, the frame member 12b is an approximately U-shape. In FIG. 8, the frame member 12b includes mutually parallel end walls 51, 52. One end wall 51 is joined to the cylindrical member 12a coaxially.

As shown in FIG. 8, the plurality of umbilical members 30 are curved into approximately U-shapes and are fastened by the first umbilical member fastening part 21 to the top part of the first engaging member 11. Further, the plurality of umbilical members 30 which pass through the opening part of the cylindrical member 12a and the opening part of the end wall 51, pass between the end wall 51 and the end wall 52 and extend to the outer circumferential surface of the end wall 52. Further, the second umbilical member fastening part 22 which is attached to the outer circumferential surface of the end wall 52 is used to fasten the plurality of umbilical members 30. Therefore, in the frame member 12b, the plurality of umbilical members 30 are curved forming approximately J-shapes.

Figure 9A:
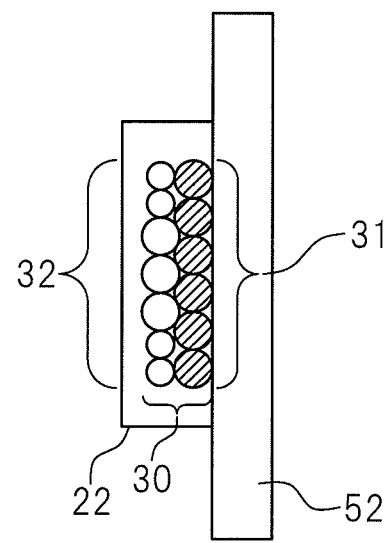
FIG. 9A is a cross-sectional view of the umbilical member treatment device seen along the line E-E of FIG. 8.

FIG. 9A is a cross-sectional view of the umbilical member treatment device seen along the line E-E of FIG. 8. As can be seen from FIG. 8 and FIG. 9A, the one group of umbilical members 31 which are arranged in a ribbon shape are fastened by the second umbilical member fastening part 22 to the inside wall side near the end wall 52. Further, the remaining group of umbilical members 32 are positioned further inside from the one group of umbilical members 31, that is, farther from the end wall 52 than the group of umbilical members 31.

Figure 9B:
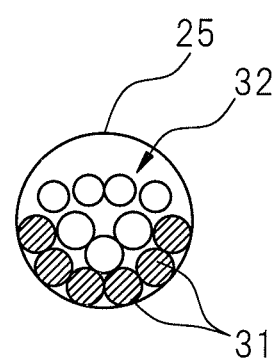
FIG. 9B is a cross-sectional view of the umbilical member treatment device seen along the line F-F of FIG. 8.

FIG. 9B is a cross-sectional view of the umbilical member treatment device seen along the line F-F of FIG. 8. In the same way as the first embodiment, the one group of umbilical members 31 which are arranged in a ribbon shape are positioned at the bottom half of the pipe member 25 and abut on the abutting locations 19a, 19b at the inner circumferential surfaces near the two ends of the pipe member 25. Further, the remaining group of umbilical members 32 are positioned at other parts of the pipe member 25 where the one group of umbilical members 31 are not present.

In this way, in the first and second embodiments, among the plurality of umbilical members 30 which are curved in approximately U-shapes or approximately J-shapes, the one group of umbilical members 31 are made integral so as to form a ribbon shape. Therefore, one or more of the remaining group of umbilical members 32 will never enter into the one group of umbilical members 31. For this reason, the one group of umbilical members 31 and the remaining group of umbilical members 32 will never tangle with each other.

Furthermore, as can be seen from FIG. 3 and FIG. 8, the group of umbilical members 31 are positioned more to the outside of the approximately U-shapes or approximately J-shapes than the remaining group of umbilical members 32. In other words, in the present invention, a two-layer structure is obtained comprised of the one group of umbilical members 31 which are arranged in a ribbon shape and the remaining group of umbilical members 32. For this reason, in the present invention, it is possible to obtain advantageous effects similar to those when employing an inside pipe member and an outside pipe member.

Further, the one group of umbilical members 31 abut on the inner circumferential surfaces at the end parts of the pipe member 25. For this reason, in the present invention, one or more among the remaining group of umbilical members 32 will never enter between the one group of umbilical members 31 and the pipe member 25 at the outside part of the approximately U-shapes or approximately J-shapes. Furthermore, for the above-mentioned reasons, the one group of umbilical members 31 will not freely move inside the pipe member 25 more than necessary and further will never be twisted more than necessary.

Furthermore, the remaining group of umbilical members 32 move in accordance with the behavior of the one group of umbilical members 31 which are arranged in a ribbon shape, so these remaining umbilical members will never be twisted more than necessary. Therefore, the remaining group of umbilical members 32 can be prevented from tangling with each other and the group of umbilical members 32 can be prevented from being locally twisted and breaking early.

Further, the umbilical member treatment device 10 of the present invention is structurally simple and can be reduced in size even compared with when employing an inside pipe member and an outside pipe member. For this reason, as shown in FIG. 14, even at the front end of the wrist part of the industrial robot 1, the umbilical member treatment device 10 of the present invention can be easily provided without enlarging the wrist part.

Figure 10A:
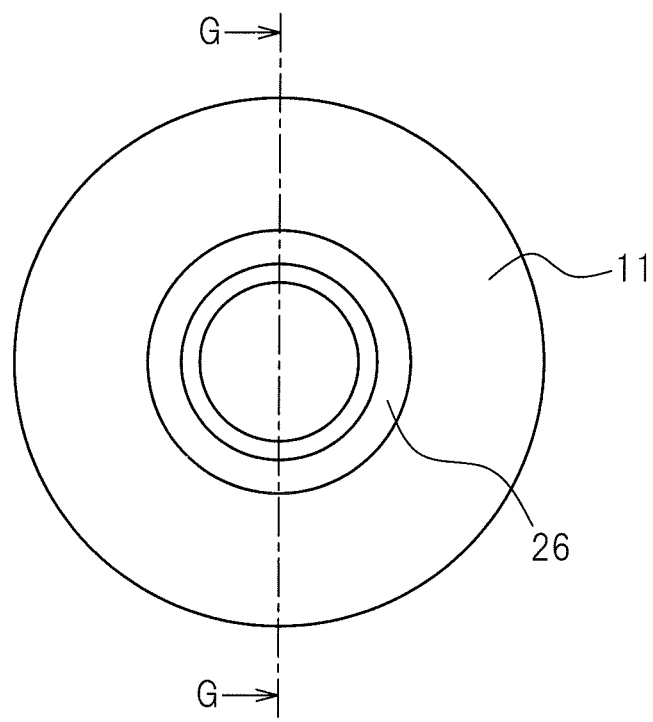
FIG. 10A is an end view of an umbilical member treatment device in another embodiment of the present invention.
Figure 10B:
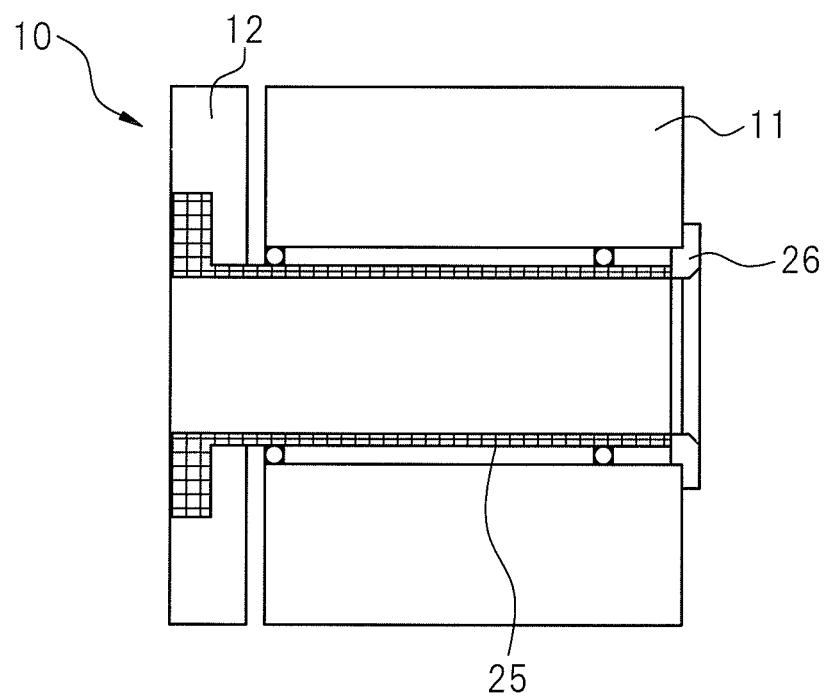
FIG. 10B is a cross-sectional view seen along the line G-G of FIG. 10A.

FIG. 10A is an end view of an umbilical member treatment device in another embodiment of the present invention, while FIG. 10B is a cross-sectional view seen along the line G-G of FIG. 10A. As can be seen from these figures, at the end face of the first engaging member 11 which is positioned at the opposite side from the second engaging member 12, a collar 26 is arranged. This collar 26 covers the end part of the pipe member 25 and the opening part which is formed at the end face of the first engaging member 11. The collar 26 has a relatively smooth surface and is preferably formed from a low friction material.

In such a configuration, the plurality of umbilical members 30 which pass through the collar 26 no longer receive local load at the opening part of the first engaging member 11. Further, for this reason, the inner circumferential surface of the collar 26 which the plurality of umbilical members 30 contact is preferably formed with a rounded edge.

Figure 11A:
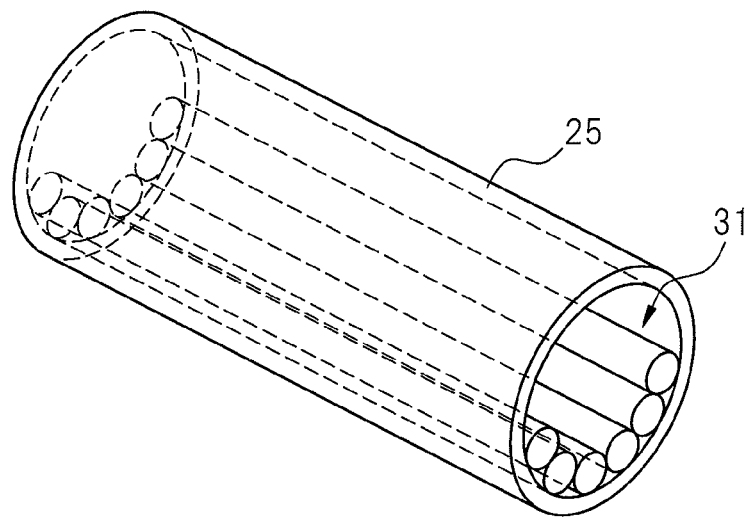
FIG. 11A is a first perspective view of a pipe member.
Figure 11B:
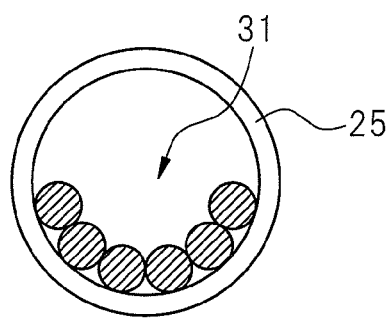
FIG. 11B is an end view of one end of a pipe member which is shown in FIG. 11A.
Figure 11C:
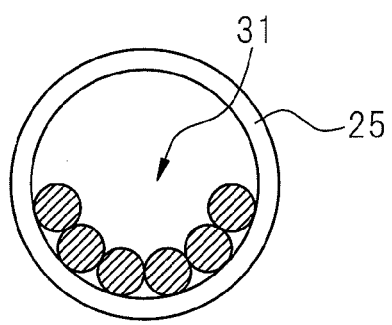
FIG. 11C is an end view of the other end of the pipe member which is shown in FIG. 11A.

In this regard, FIG. 11A is a first perspective view of a pipe member, while FIG. 11B and FIG. 11C are end views of the pipe member which is shown in FIG. 11A. In FIG. 11A to FIG. 11C, among the plurality of umbilical members 30, only the one group of umbilical members 31 which are arranged in a ribbon shape are illustrated inside the pipe member 25. Note that, the pipe member 25 which is shown in FIG. 11 and the later mentioned FIG. 12 and FIG. 13 are assumed to be fastened inside the second engaging member 12 of the configuration which is shown in FIG. 1.

In FIG. 11A to FIG. 11C, the first engaging member 11 and second engaging member 12 of the umbilical member treatment device 10 do not rotate with respect to each other. The first engaging member 11 and the second engaging member 12 are assumed to be at their respectively predetermined initial positions. For this reason, as can be seen from FIG. 11B and FIG. 11C, the one group of umbilical members 31 are positioned at the bottom part of the pipe member 25 at the two ends of the pipe member 25.

Figure 12A:
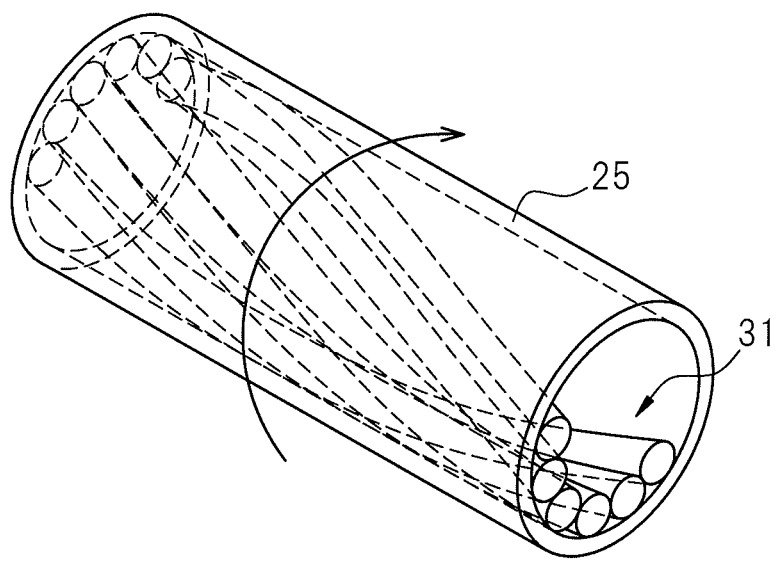
FIG. 12A is a second perspective view of a pipe member.
Figure 12B:
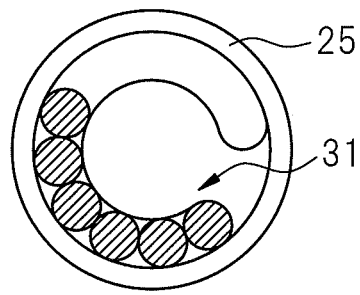
FIG. 12B is an end view of one end of the pipe member which is shown in FIG. 12A.
Figure 12C:
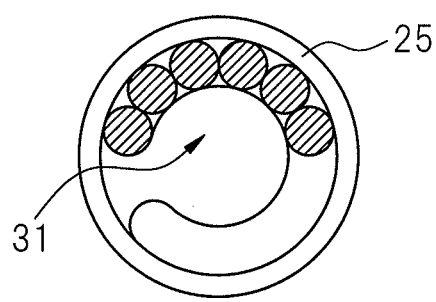
FIG. 12C is an end view of the other end of the pipe member which is shown in FIG. 12A.
Figure 13A:
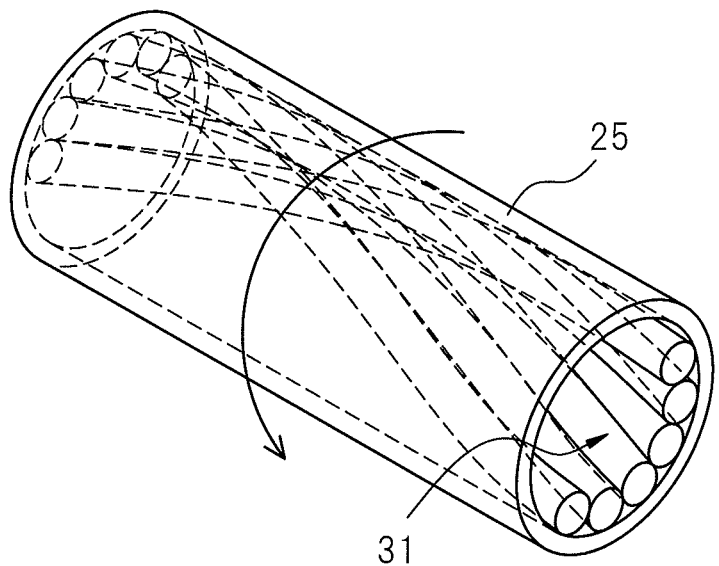
FIG. 13A is a third perspective view of a pipe member.
Figure 13B:
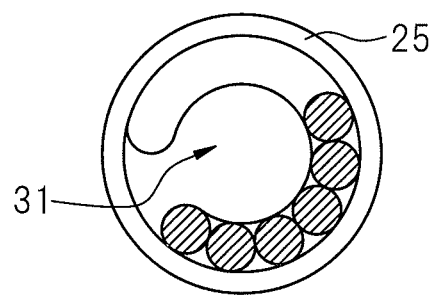
FIG. 13B is an end view of one end of the pipe member which is shown in FIG. 13A.
Figure 13C:
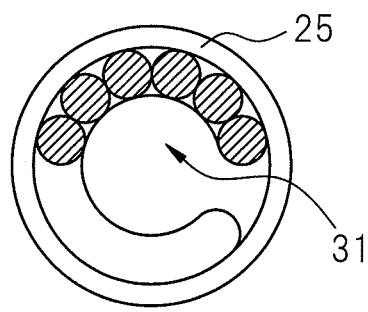
FIG. 13C is an end view of the other end of the pipe member which is shown in FIG. 13A.

On the contrary, FIG. 12A to FIG. 12C are respectively views similar to FIG. 11A to FIG. 11C in the case where the first engaging member 11 is rotated with respect to the second engaging member 12 from the initial position to the right by 180°. Further, FIG. 13A to FIG. 13C are respectively views similar to FIG. 11A to FIG. 11C in the case where the first engaging member 11 is rotated with respect to the second engaging member 12 from the initial position to the left by 180°.

As can be seen when comparing FIG. 12B and FIG. 12C, the one group of umbilical members 31 are positioned at the bottom part of the pipe member 25 at one end of the pipe member 25 and are positioned at the top part of the pipe member 25 at the other end of the pipe member 25. The same is true for the case referring to FIG. 13B and FIG. 13C.

However, as can be seen from these figures, even if making the first engaging member 11 rotate with respect to the second engaging member 12 from the initial position by 180°, the one group of umbilical members 31 will never move inside the pipe member 25 by 180°. As illustrated, the amount of rotational movement of the one group of umbilical members 31 is smaller than 180°.

The reason is that the plurality of umbilical members 30 including the one group of umbilical members 31 are fastened by the first umbilical member fastening part 21 and the second umbilical member fastening part 22. For this reason, even if the first engaging member 11 rotates by 180°, the one group of umbilical members 31 will never freely move more than necessary. In other words, the remaining rotational motion of the first engaging member 11 is absorbed by the parts of the one group of umbilical members 31 which form the approximately U-shapes or approximately J-shapes.

Furthermore, the one group of umbilical members 31 themselves move while forming the ribbon shape near the inner circumferential surface of the pipe member 25, so the one group of umbilical members 31 will never receive local twisting inside of the pipe member 25. Furthermore, the remaining group of umbilical members 32 which are not shown in FIG. 11 to FIG. 13, as explained above, never enter into the one group of umbilical members 31. Furthermore, the remaining group of umbilical members 32 never enter between the part of the inner circumferential surface of the pipe member 25 near the one group of umbilical members 31 and the one group of umbilical members 31. Therefore, it will be understood that the advantageous effects such as stated above are obtained inside a predetermined range of rotational angle of the wrist part of the robot to which the umbilical member treatment device 10 is attached.

Figure 15:
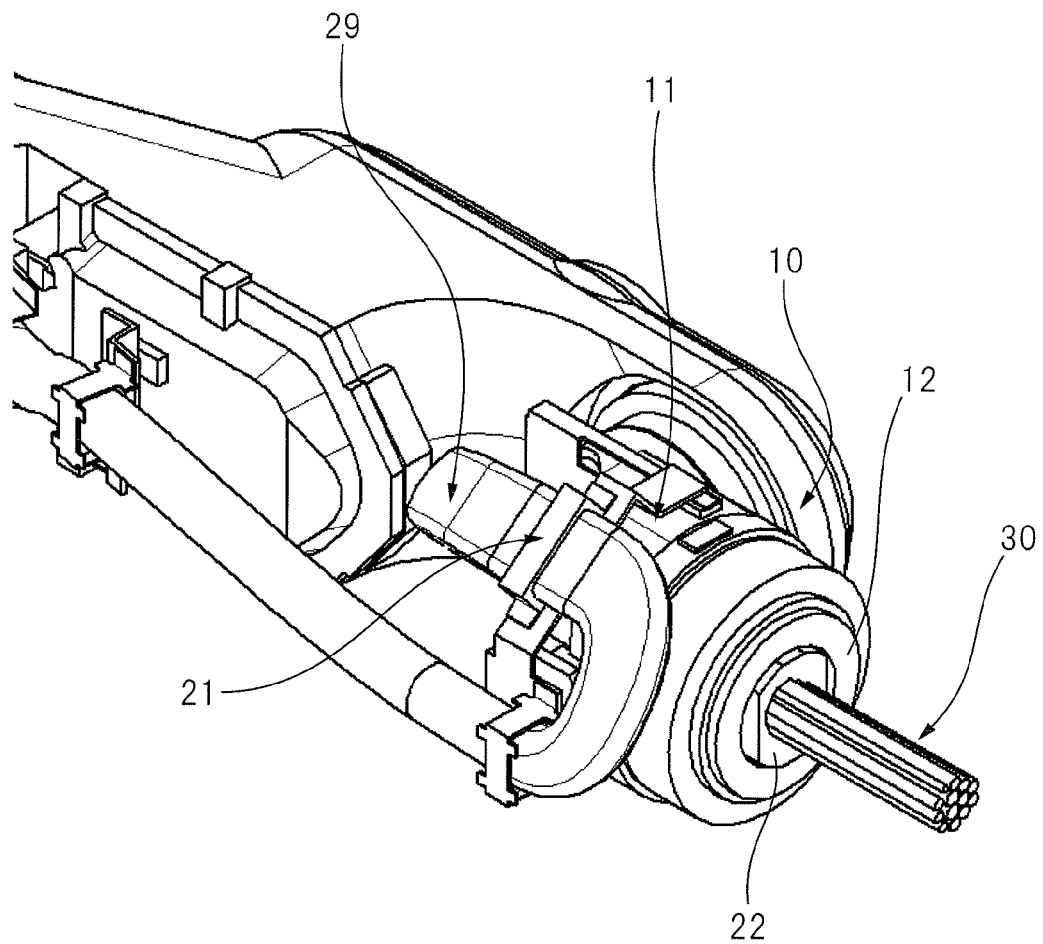
FIG. 15 is an enlarged view of a wrist part of the robot which is shown in FIG. 14.

FIG. 15 is an enlarged view of a wrist part of the robot which is shown in FIG. 14. FIG. 15 shows an umbilical member treatment device 10 which is provided at a wrist part of the robot 1. As illustrated, the plurality of umbilical members 30 extend from the second umbilical member fastening part 22 to the inside of the umbilical member treatment device 10. Further, these plurality of umbilical members 30 are curved from the end face of the first engaging member 11 in approximately U-shapes and are fastened by the first umbilical member fastening part 21 to the top part of the first engaging member 11.

As can be seen from FIG. 15, the plurality of umbilical members 30 which are led out from the first engaging member 11 are covered by the cover 29. This cover 29 covers the surroundings of the plurality of umbilical members 30 at least between the first engaging member 11 and the first umbilical member fastening part 21. As shown in the figure, the cover 29 may also cover the plurality of umbilical member 30 in a direction moving away from the first engaging member 11 starting from the first umbilical member fastening part 21.

The remaining rotational motion of the plurality of umbilical member 30 is absorbed by the parts of the one group of umbilical members 31 which form the approximately U-shapes or approximately J-shapes. Therefore, the cover 29 is preferably formed from a flexible material. Due to this, the plurality of umbilical members 30 can be reliably protected from spatter during welding work. However, even the case where the cover 29 is formed from a hard material is included in the scope of the present invention.

Figure 16:
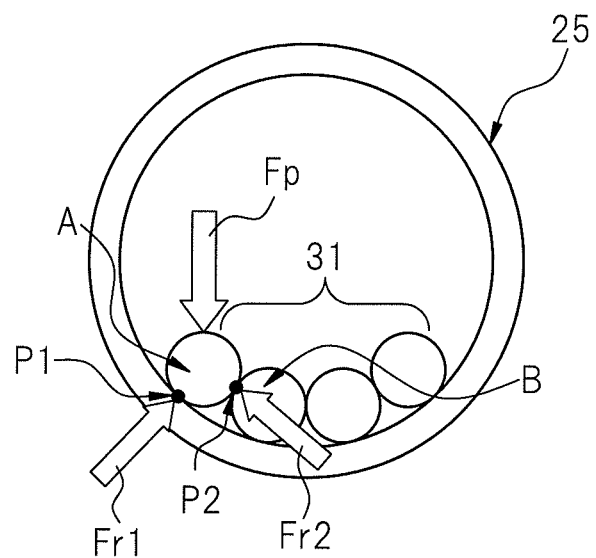
FIG. 16 is a cross-sectional view of a pipe member.

Here, the one group of umbilical members 31 which form the ribbon shape will be explained. FIG. 16 is a cross-sectional view of a pipe member. In FIG. 16, at the inside of the pipe member 25, a plurality of, here, four, umbilical members 31 are arranged adjoining each other in a ribbon shape. As shown in the figure, these one group of umbilical members 31 abut on the inner circumferential surface of the pipe member 25. Further, as shown in FIG. 3 or FIG. 8, the one group of umbilical members 31 form approximately U-shapes or approximately J-shapes when fastened by the umbilical member fastening parts 21, 22. In such a case, as shown in FIG. 16, a pressing force Fp acts which presses the one group of umbilical members 31 downward against the pipe member 25.

Figure 17A:
FIG. 17A is a first side view of a plurality of umbilical members which form a ribbon shape.
Figure 17B:
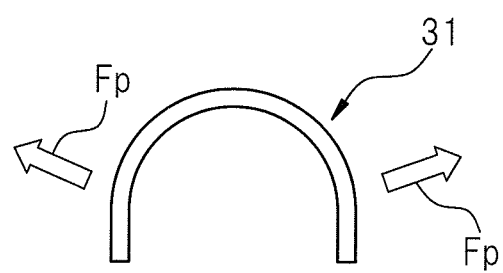
FIG. 17B is a second side view of a plurality of umbilical members which form a ribbon shape.

Further, FIG. 17A and FIG. 17B are side views of the one group of umbilical members which form a ribbon shape. As shown in FIG. 17A, when the one group of umbilical members 31 are not curved, but are straight, no force acts on the one group of umbilical members 31. However, as shown in FIG. 17B, when the one group of umbilical members 31 are curved in approximately U-shapes, due to the elasticity of the umbilical members 31, forces Fp by which the umbilical member 31 try to return to straight shapes act near the two ends of the umbilical members 31. These forces Fp correspond to the downward pressing force Fp at the inside of the pipe member 25. Therefore, the magnitude of the pressing force Fp is adjusted by changing the size of the approximately U-shapes or approximately J-shapes.

Further, as shown in FIG. 16, two umbilical members which adjoin each other among the one group of umbilical members 31 are called the "umbilical members A and B". The pipe member 25 is circular in cross-section, so if a pressing force Fp acts on an umbilical member A, a reaction force Fr1 will act at a contact point P1 between the umbilical member A and the pipe member 25. Simultaneously, a reaction force Fr2 will act at a contact point P2 between the umbilical member A and an umbilical member B. As can be seen from FIG. 16, these reaction forces Fr1 and Fr2 support the pressing force Fp. Further, the reaction force Fr1 acts so that the other umbilical members 31 and the remaining group of umbilical members 32 (not shown in FIG. 16) do not enter between the inner circumferential surface of the pipe member 25 and the umbilical member A. Similarly, the reaction force Fr2 acts so that the other umbilical members 31 and the remaining group of umbilical members 32 (not shown in FIG. 16) do not enter between the umbilical member A and the umbilical member B.

In the present invention, the one group of umbilical members 31 which are fastened by the umbilical member fastening parts 21, 22 are curved to form approximately U-shapes or approximately J-shapes and are pressed against the inner circumferential surface of the pipe member 25. Therefore, even at the parts which abut on the inner circumferential surface of the pipe member 25, mutually adjoining forces act on the one group of umbilical members 31 (please see reaction force Fr2).

The one group of umbilical members 31 are fastened so as to adjoin each other at the start point of the approximately U-shapes or approximately J-shape parts (umbilical member fastening part). At the end point (inside circumferential surface of pipe member 25), mutually adjoining forces act on the one group of umbilical members 31. Therefore, even at the middle part between these start point and end point, the one group of umbilical members 31 form a ribbon shape. Further, the remaining group of umbilical members 32 are adjusted in layout and length so as to pass through the insides of the approximately U-shape or approximately J-shape parts of the one group of umbilical members 31. For this reason, even at the middle part of the approximately U-shapes or approximately J-shapes, the remaining group of umbilical members 32 will never enter into the one group of umbilical members 31.

Furthermore, the one group of umbilical members 31 are fastened in parallel with the rotational axis so as to maintain a ribbon shape (FIG. 1 to FIG. 3) or are fastened by the second umbilical member fastening part 22 so as to abut on the inner circumferential surface of the pipe member 25 at the other end of the pipe member 25 as well. Therefore, even inside of the pipe member 25, the one group of umbilical members 31 form a ribbon shape.

Figure 18:
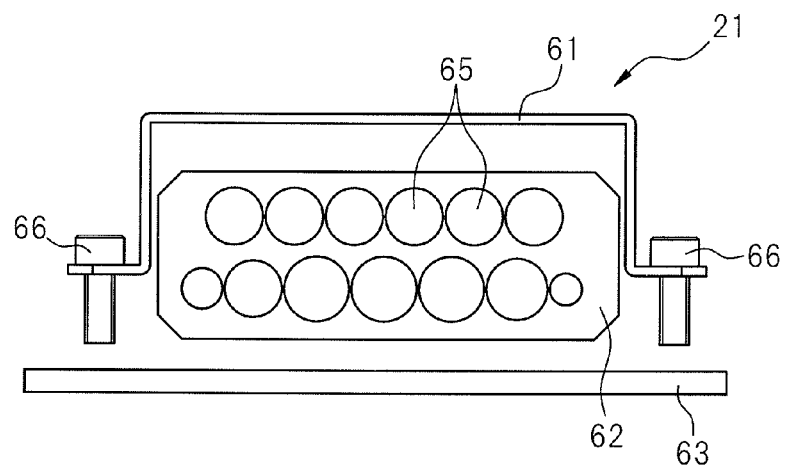
FIG. 18 is an enlarged view of an umbilical member fastening part in a certain embodiment.

Further, FIG. 18 is an enlarged view of an umbilical member fastening part in a certain embodiment, for example, the umbilical member fastening part 21. In FIG. 18, the umbilical member fastening part 21 includes a rubber clamp 62 which is comprised of hard rubber in which a plurality of through holes 65 are formed. In these through holes 65, the plurality of umbilical members 30 are inserted. Therefore, the dimensions of the through holes 65 are determined corresponding to the outer shapes of the corresponding umbilical members.

As illustrated, an approximately U-shape first fastening part 61 surrounds the rubber clamp 62 and sits on a plate-shaped second fastening part 63. The second fastening part 63 may also be a part of the first engaging member 11. Further, two bolts 66 are used to fasten the first fastening part 61 to the second fastening part 63. For this purpose, the second fastening part 63 is formed with taps.

Due to this, the rubber clamp 62 is gripped between the first fastening part 61 and the second fastening part 63 and is crushed just a little. Therefore, the plurality of umbilical members 30 can be fastened inside of the through holes 65. Only naturally, another configuration of the umbilical member fastening part 21 can be used to fasten the plurality of umbilical members 30.

Figure 19A:
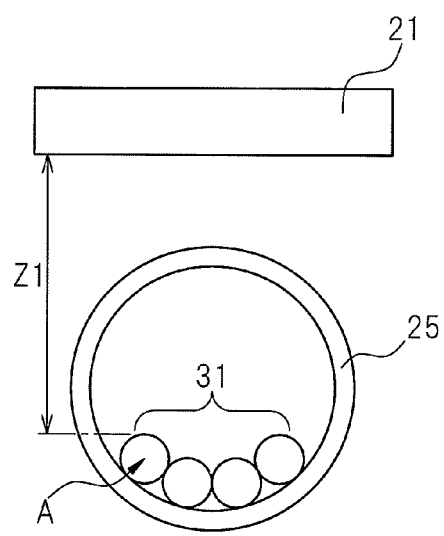
FIG. 19A is a cross-sectional view of a pipe member and umbilical member fastening part at an end part of the pipe member.
Figure 19B:
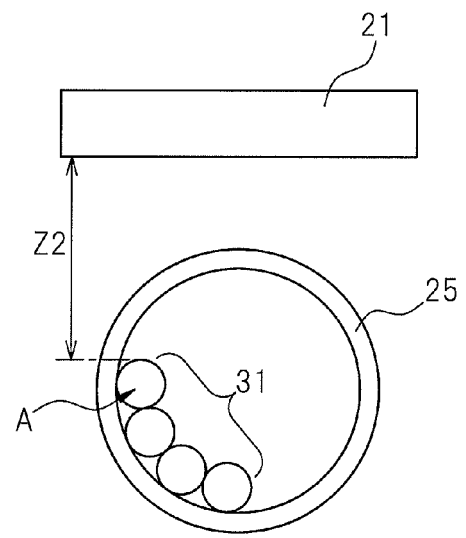
FIG. 19B is another cross-sectional view of a pipe member and umbilical member fastening part at an end part of the pipe member.
Figure 20A:
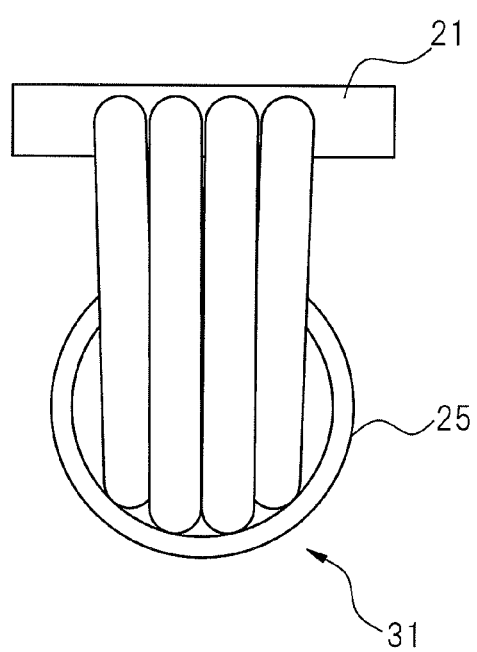
FIG. 20A is an end view of a pipe member.
Figure 20B:
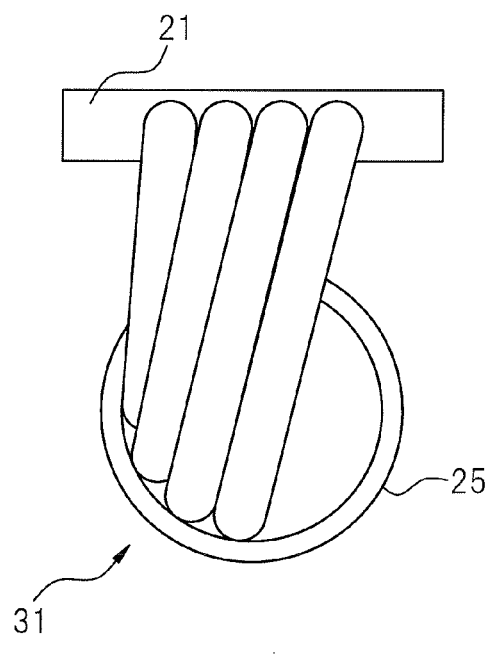
FIG. 20B is another end view of a pipe member.

FIG. 19A and FIG. 19B are cross-sectional views of a pipe member and umbilical member fastening part at an end of a pipe member. Furthermore, FIG. 20A and FIG. 20B are end views of a pipe member. Referring to these figures, the fact that the one group of umbilical members 31 will not freely move inside of the pipe member 25 more than necessary and further will not be twisted more than necessary will be explained.

Consider the rotational movement of the one group of umbilical members 31 inside of the pipe member 25 from the state of FIG. 19A to the state of FIG. 19B. In this case, the distance between the umbilical member A which is positioned at the left in the one group of umbilical members 31 and the umbilical member fastening part 21 is reduced from the distance Z1 to the distance Z2. Therefore, it will be learned that the umbilical member A is subjected to a stronger pressing force. The amount of twisting of the umbilical member A at the inside of the pipe member 25 is restricted so that the position of the umbilical member A at the end part of the pipe member 25 balances with the pressing force. For this reason, the one group of umbilical members 31 will not freely move inside of the pipe member 25 more than necessary.

FIG. 20A and FIG. 20B correspond to end views of the pipe member 25 in the case where the one group of umbilical members 31 rotate inside of the pipe member 25 from the state of FIG. 19A to the state of FIG. 19B. These FIG. 20A and FIG. 20B show the parts of the one group of umbilical members 31 which form the approximately U-shapes or approximately J-shapes. The one group of umbilical members 31 never move in the horizontal direction exceeding the inside diameter of the pipe member 25. Further, the elasticity of the parts which form the approximately U-shapes or approximately J-shapes and the twisting of the one group of umbilical members 31 themselves enable the remaining rotational motion to be absorbed. For this reason, the one group of umbilical members 31 will never be twisted inside of the pipe member 25 more than necessary.

Advantageous Effects of Invention

In the present invention, at least two umbilical members among a plurality of umbilical members are arranged adjoining each other in a ribbon shape and abut on the inner circumferential surface near one end or both ends of a pipe member. For this reason, the remaining umbilical members will not enter between the at least two umbilical member and, further, will not enter between the at least two umbilical members and the pipe member at the outside parts of the approximately U-shapes or approximately J-shapes. In other words, in the present invention, the at least two umbilical members which are arranged in a ribbon shape and the remaining umbilical members will never tangle with each other.

Therefore, in the present invention, a two-layer structure comprised of the at least two umbilical members arranged in a ribbon shape and the remaining umbilical members is obtained. For this reason, in the present invention, it is possible to obtain effects similar to those when employing an inside pipe member and an outside pipe member. Further, the at least two umbilical members arranged in a ribbon shape abut on the inner circumferential surface at the ends of the pipe member, so the at least two umbilical members will not move freely inside the pipe member more than necessary and will not be twisted more than necessary.

Furthermore, the remaining umbilical members move in accordance with the behavior of at least two umbilical members which are arranged in a ribbon shape, so these remaining umbilical members also are never twisted more than necessary. Therefore, it is possible to prevent the remaining umbilical members from tangling with each other and prevent the remaining umbilical members from being locally twisted and breaking early.

Further, the umbilical member treatment device of the present invention is structurally simple and can be made smaller in size even compared with employing an inside pipe member and an outside pipe member. For this reason, even at the front end of the wrist part of the industrial robot, the umbilical member treatment device of the present invention can be easily provided.

Typical embodiments were used to explain the present invention, but it will be understood that a person skilled in the art could make the above-mentioned changes and various other changes, deletions, and additions without departing from the scope of the present invention.

The invention claimed is:

1. An umbilical member device which passes a plurality of umbilical members between a first engaging member and a second engaging member which are engaged with each other and which rotate relative to each other about a predetermined rotational axis of a robot, comprising:
   a pipe member which is attached to said second engaging member coaxially with said rotational axis and through the inside of which said plurality of umbilical members pass; and
   umbilical member fastening parts at both said first engaging member and said second engaging member, said umbilical member fastening parts fastening said plurality of umbilical members so that at one end or both ends of said pipe member, said plurality of umbilical members approximately, form U-shapes or J-shapes,
   wherein at said umbilical member fastening parts, at least two umbilical members among said plurality of umbilical members are arranged to laterally adjoin each other so that the at least two umbilical members form a ribbon shape, and
   wherein all of said at least two umbilical members that form the ribbon shape are made to abut on an inner circumferential surface near one end or both ends of said pipe member within a range of relative rotational angle between said first engaging member and second engaging member.

2. The umbilical member device as set forth in claim 1, wherein said at least two umbilical members that form the ribbon shape are given elasticities which are higher than the elasticities of remaining umbilical members among said plurality of umbilical members.

3. The umbilical member device as set forth in claim 1, wherein at least part of the inner circumferential surface of said pipe member is surface treated so that friction of at least part of the inner circumferential surface of said pipe member which said umbilical members contact is made to become smaller the friction at the remaining part of the inner circumferential surface of said pipe member.

4. The umbilical member device as set forth in claim 2, wherein at least part of the inner circumferential surface of said pipe member is surface treated so that friction of at least part of the inner circumferential surface of said pipe member which said umbilical members contact is made to become smaller the friction at the remaining part of the inner circumferential surface of said pipe member.

5. The umbilical member device as set forth in claim 1, which further includes a collar which is provided at least at one of an end and inner circumferential surface of said pipe member which said umbilical members contact.

6. The umbilical member device as set forth in claim 2, which further includes a collar which is provided at least at one of an end and inner circumferential surface of said pipe member which said umbilical members contact.

7. The umbilical member device as set forth in claim 3, which further includes a collar which is provided at least at one of an end and inner circumferential surface of said pipe member which said umbilical members contact.

8. The umbilical member device as set forth in claim 1, which further includes a cover which covers up to said umbilical member fastening part corresponding to an end of said pipe member from that end.

9. The umbilical member device as set forth in claim 2, which further includes a cover which covers up to said umbilical member fastening part corresponding to an end of said pipe member from that end.

10. The umbilical member device as set forth in claim 3, which further includes a cover which covers up to said umbilical member fastening part corresponding to an end of said pipe member from that end.

11. The umbilical member device as set forth in claim 5, which further includes a cover which covers up to said umbilical member fastening part corresponding to an end of said pipe member from that end.

12. The umbilical member device as set forth in claim 1, wherein said first engaging member and said second engaging member form parts of a body of the robot.

13. The umbilical member device as set forth in claim 1, wherein said first engaging member and said second engaging member are members which form a wrist part of a body of said robot.

14. The umbilical member device as set forth in claim 1, wherein the pipe member that is attached to said second engaging member penetrates into a through-hole of the first engaging member to rotatably engage with the first engaging member, a central axis of the through hole being the rotational axis of the robot.

15. The umbilical member device as set forth in claim 1, wherein said plurality of umbilical members include the at least two umbilical members and remaining umbilical members.

* * * * *